Patented Mar. 10, 1925.

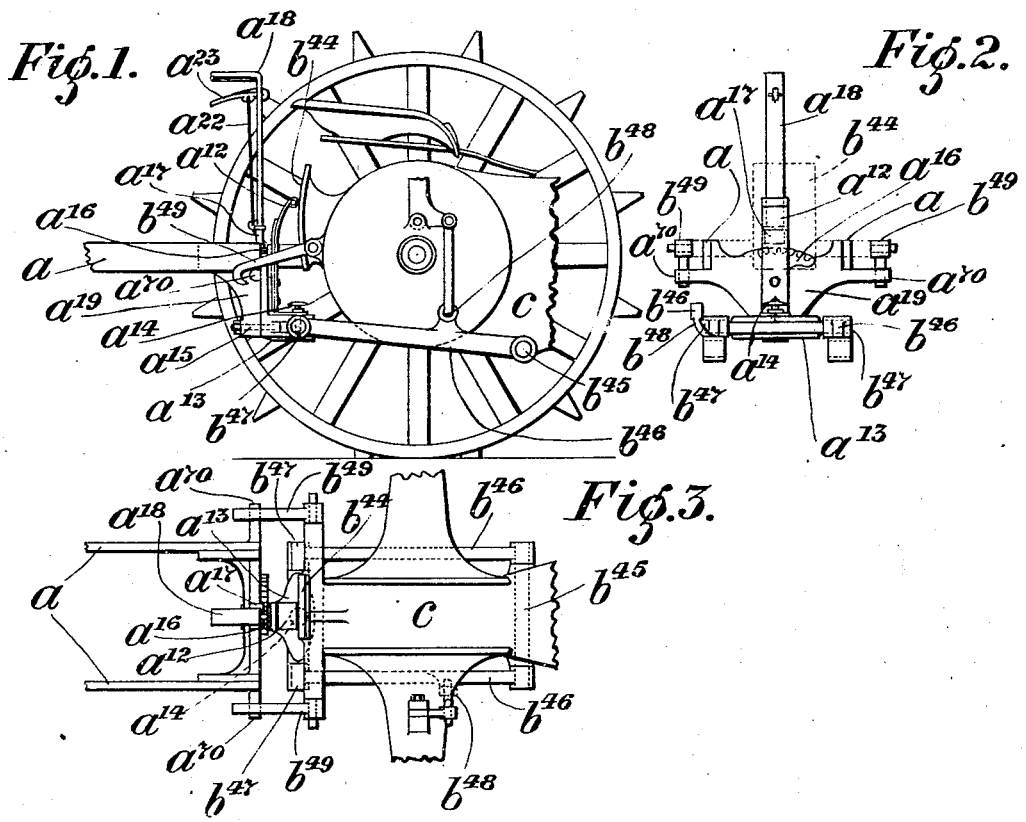

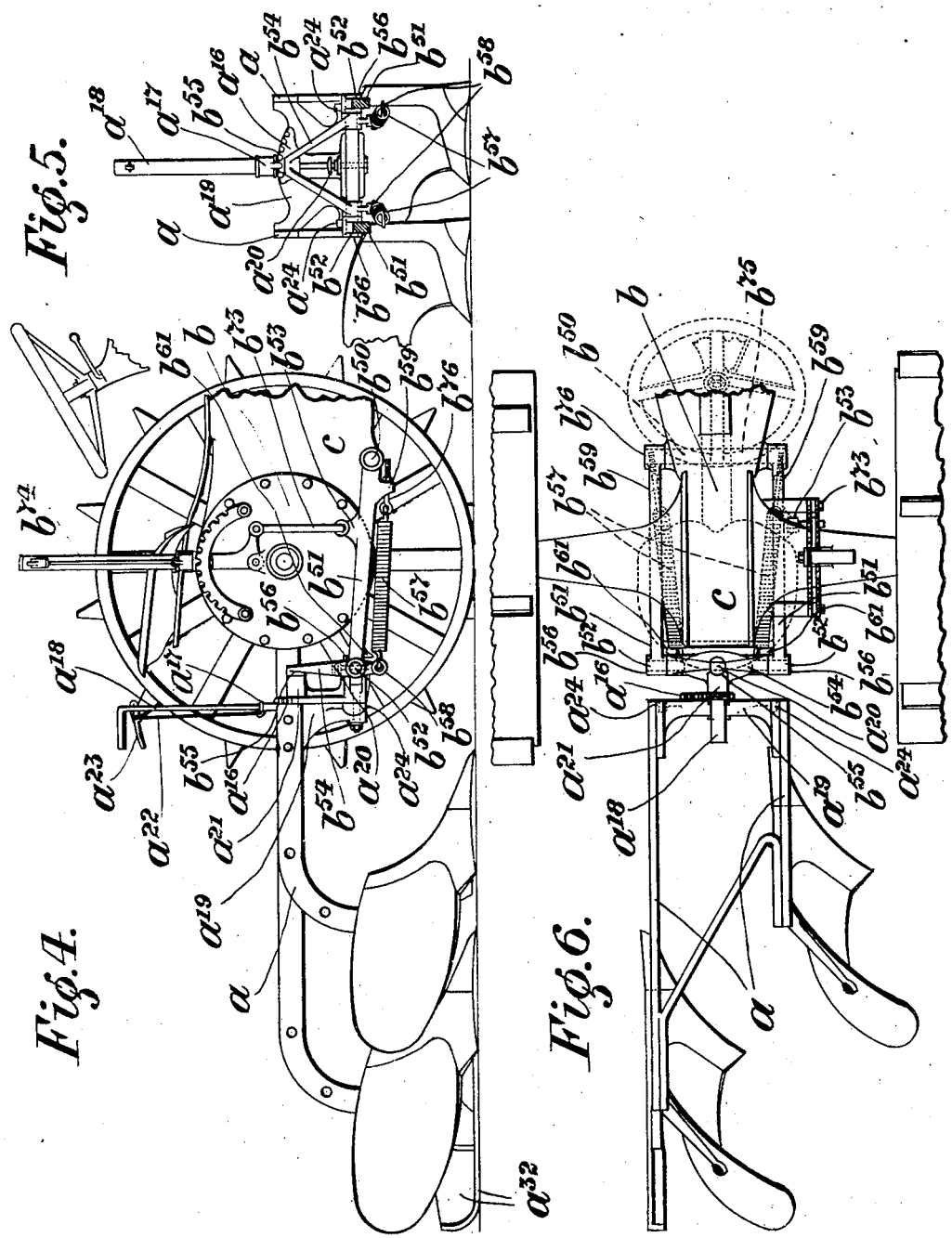

1,529,425

UNITED STATES PATENT OFFICE.

HARRY FERGUSON, OF BELFAST, IRELAND.

PLOW.

Original application filed August 24, 1918, Serial No. 251,202. Divided and this application filed March 8, 1919. Serial No. 281,520.

*To all whom it may concern:*

Be it known that I, HARRY FERGUSON, of 83 May Street, Belfast, Ireland, a subject of the King of Great Britain and Ireland, have invented certain new and useful Improvements Relating to Plows, of which the following is a specification.

This invention relates to single or multi-furrow plows, and its object is to make a light plow work efficiently and to be controlled simply.

My present application is a division of my former application #251,202 filed Aug. 24th, 1918.

Hitherto in order to maintain the proper depth of the plow in the ground, it has been usual to make the plow of such weight as would ensure the proper depth of cut and regularity of ploughing, or the plow has carried an operator, who, acting as a weight, keeps the plow steady in the ground. The difficulty of keeping a light plow in the ground is particularly found when using tractor plows where it is very desirable that the plow should have freedom of movement relatively to the tractor, both vertically and laterally.

A lateral movement of the plow relative to the tractor is essential in order to make it possible to plow efficiently whilst the tractor is turning to the right or left. A vertical movement of the plow in relation to the tractor is essential for good ploughing work when the tractor runs over an obstacle or when it is leaving a hill and getting on to the level, or vice versa.

Under my invention the plow is so coupled or connected to the tractor that, while it has freedom of movement up and down and also laterally relatively to the tractor, yet it can be maintained automatically in the ground when being drawn by the tractor.

In order to prevent the plow moving angularly upwards, about its connection to the tractor while being drawn thereby, I provide means co-acting with the tractor and implement which automatically acts to resist any tendency of the rear of the plow to rise under the draft of the tractor. The means may consist of a spring attached to the head of the plow frame and acting against a plate or abutment on the tractor. By arranging for the spring to act against an abutment on the tractor the latter is caused to function as a means for holding the plow down to its work so that a light weight plow can be coupled to a tractor and work effectively.

Should the upward lift of the plow be very great, owing to hard or stiff land, it may, through the spring and abutment, tend to lift the rear of the tractor whose dead-weight thereupon functions to hold down the plow.

Under another arrangement, a forked head on the plow is fitted over a horizontal shaft at the end of the plow lifting cranks. Through this forked head and shaft, a safety or draw pin is fitted by which the plow is connected to the tractor; a member is turnably connected to the forked head, and to one end of this member springs are connected, the other end of the springs being connected to the plow raising and lowering crank. The other end of the above mentioned turnable member bears against an abutment on, or attached to, the plow frame and is capable of movement thereon, so that the tractor may have relative movement laterally or vertically or both laterally and vertically without affecting the depth of cut of the plow which is maintained by the spring action effected through the above mentioned turnable member.

In order that the invention may be clearly understood I have hereunto appended explanatory drawings showing examples of connection between tractor plows and their tractors in accordance with the invention. For the sake of simplicity only two wheels of the tractor are shown, although it is understood that the pulling means may be a four-wheel tractor.

Figs. 1 to 3 show a coupling between a tractor plow and its tractor and show an example of means whereby the necessary force or pressure for keeping the plow shares working in the ground at the proper depth of cut can be derived from the tractor, Fig. 1 being a side view, Fig. 2 a front view (with plow and tractor parts omitted) and Fig. 3 a plan corresponding to Fig. 1.

Figs. 4 to 6 show another form of coupling between a tractor plow and its tractor in accordance with the invention, Fig. 4 being a side view, Fig. 5 a front view (with the tractor omitted), and Fig. 6 a plan corresponding to Fig. 4.

Referring to the drawings:—

$a$ is the plow frame and $c$ the tractor.

The device illustrated at Figs. 1 to 3 for holding the plow at the proper depth of cut comprises a crank shaft $b^{45}$, crank webs $b^{46}$, a crank-pin carrier having at opposite ends crank-pins $b^{47}$, the crank pin carrier being pivoted to a fork $a^{13}$ by means of the safety pin $a^{14}$. The head $a^{19}$ of the plow is pivoted on a stud $a^{15}$ projecting from the fork $a^{13}$, so that the head $a^{19}$, the frame $a$ and, therefore, the whole plow, can swivel about a longitudinal axis of which the stud $a^{15}$ is the centre. The upper end of the fork is provided with a toothed quadrant $a^{16}$ and a pawl projecting from a sleeve $a^{17}$, which is slidably fitted on the upright $a^{18}$, is capable of engaging the quadrant $a^{16}$. The upright $a^{18}$ is rigidly connected to the plow head $a^{19}$, and, by manipulating the hand lever $a^{23}$ and rod $a^{22}$, the pawl can be caused to engage the toothed quadrant to hold the plow beams at any desired angle. A spring $a^{12}$ is fixed, at its other end to the forked head $a^{19}$ whilst its other end engages with a plate or abutment $b^{44}$ attached to the tractor, whereby any vertical movement of the rear of the plow beams deflects the spring $a^{12}$ and thereby puts increased pressure on the rear of the plow so that the spring, by pressing on the plate $b^{44}$ with the rear of the plow down on the ground, also lifts or assists in lifting, the front of the plow when the operator releases the holding means (shown with reference to Fig. 4) connected to the crank web extension $b^{48}$ and stops $a^{70}$ are provided whose function is to engage with the catches $b^{49}$ connected to the tractor and thereby limit the usual lateral movement of the rear of the plow about the safety pin $a^{14}$, particularly when reversing the plow, and to provide means whereby the rear of the plow $a$ may over-ride any obstacles encountered. The action is as follows:—

When the plow is moving over level ground it can turn to either side, within limits fixed by the relation of the catches $b^{49}$ and the stops $a^{70}$. When the plow is going either forward or being reversed and should the rear of the plow be obstructed in its turning movements, the relative position of the stop $a^{70}$ and the horizontal pin $b^{47}$ is such that the obstruction will tend to lift, or assist in lifting, the rear of the plow over the obstruction when turning to either side.

Figs. 4, 5 and 6 show a modified arrangement by which the plow may be kept at the proper depth of cut. The usual crank shaft $b^{50}$, crank webs $b^{51}$, crank pin $b^{52}$, and crank web extension $b^{53}$ are employed for connection by a rod $b^{73}$ to the holding or locking lever $b^{74}$. The safety pin $a^{20}$ connects the combination quadrant and forked head $a^{16}$ to the crank pin $b^{52}$ and a triangular balance lever $b^{54}$, the apex of which is provided with a semi-circular pad or face $b^{55}$, engages with a member $a^{21}$ which is a fixture on the combination quadrant and forked head $a^{16}$. The lever $b^{54}$ and member $a^{21}$ constitute abutting members between the tractor and plow frames. The crank pin $b^{52}$ passes through holes in the bosses $b^{56}$ and provides a fulcrum for the springs $b^{57}$ connected, at one end, to eyes $b^{58}$ on the balance lever $b^{54}$ and, at the other end, to lugs $b^{59}$ on the crank webs $b^{51}$. The usual combination quadrant and forked head $a^{16}$ and pawl $a^{17}$ sliding on the upright $a^{18}$, is operated by rod $a^{22}$ and hand lever $a^{23}$, the upright $a^{18}$ being rigidly connected to the plow head $a^{19}$, and serving to hold or lock the plow beams at any desired angle, as hereinbefore described. When the operator releases the holding or locking lever $b^{74}$ and lowers the plow into the ground, the crank web $b^{51}$ and the plow frame $a$ would assume a different angle relative to each other, thereby tending to stretch the springs $b^{57}$ and to exert a pressure on the rear of the plow through the medium of the eyes $b^{58}$, crank pin $b^{52}$, semi-circular pad or face $b^{55}$ and abutment $a^{21}$. The tendency of the springs $b^{57}$ is to impart a turning motion to the crank webs $b^{51}$ round the crank pin $b^{52}$, but, as the crank shaft $b^{50}$ is fixed in a bearing at $b^{75}$ on the tractor $b$, this turning motion cannot take place, therefore the tendency is to lift the crank webs $b^{51}$, together with the front of the plow beams $a$, so that the springs $b^{57}$ tend to lift the front of the plow and consequently throw the weight on to the rear thereof.

Should the plow not be sufficiently heavy to keep, when tilted, as aforesaid the rear at the proper depth of cut, the springs $b^{57}$ would be made sufficiently strong to cause the weight of the tractor itself to act through the medium of the mechanism hereinbefore described, as a means for holding down the plow. The springs $b^{57}$, in addition to tending to lift the front of the plow, would also, owing to the rear of the plow being on the ground, tend to continue their action and to lift the rear of the tractor whose weight would be therefore utilized to hold down the rear of the plow. When the operator releases the usual control lever $b^{74}$ on the tractor connected to the crank web extension $b^{53}$, the ground on which the rear of the plow rests and the crank shaft $b^{50}$ serve as fulcrums for raising the front of the plow and the rear of the tractor, through the medium of the springs $b^{57}$. These springs may be adjustable, e. g. by means of screwed eye bolt $b^{76}$. The rear of the plow has freedom of movement laterally about the pin $a^{20}$ and vertically about the axis of the crank pin $b^{52}$. The stoppers $a^{24}$ limit the movement of the front of the plow frame laterally when reversing, by coming into contact with the bosses $b^{56}$ on the crank webs $b^{51}$. The springs $b^{57}$ assist the operator to control the plow by their tendency to balance the weight of the front of the plow and the crank webs by using the rear of the plow as a fulcrum.

For the purpose of facilitating the attachment and detachment of the plow to the tractor, it is necessary to take the load off the safety pin, imposed on it by the action of the springs $b^{57}$, acting through the crank pin $b^{52}$, pad or face $b^{55}$, and abutment $a^{21}$ which tend to give a rearward movement to the plow, which movement is prevented by the safety pin $a^{20}$.

This relief of the load from the safety pin may be done in various ways. Preferably I use a projection $b^{61}$ on the crank webs $b^{51}$, against which projections the eyes $b^{58}$ on the triangular balance lever $b^{54}$ are adapted to make contact when the plow is raised to a predetermined position by means of the control lever $b^{74}$ as usual. When this happens the action of the springs $b^{57}$ is neutralized by the projection $b^{61}$ coming into contact with the eyes $b^{58}$ so that on any further movement of the lever lifting the front of the plow causes the pad or face $b^{55}$ to leave the abutment $a^{21}$, thus taking all rearward load imposed on the plow by the springs $b^{57}$ and leaving the safety pin $a^{20}$ free from the load so that it can be readily removed. A further effect of this cutting out of the spring action is that for turning on the headland, or for reversing or for transport, there is no load imposed by the springs on the heel slide $a^{22}$ of the plow at the rear. The crank web bosses $b^{56}$ may be eccentric to the crank pin $b^{52}$ for the purpose of limiting or reducing the freedom of lateral movement of the rear of the plow with the result that, as the plow is raised for reversing, the crank web bosses $b^{56}$ will be brought closer to the stoppers $a^{24}$, thereby limiting or reducing the lateral movement of the rear of the plow when reversing, whilst giving the necessary freedom when the bosses $b^{56}$ are lowered for ploughing.

It will be clear that provision is made to reduce or prevent upward and downward pitching of the implement while the tractor might be operating over wavy ground.

Should the front wheels of the tractor run up on a height, that would, if the plow were rigid with the tractor, either force the implement too deeply into the ground, or the rear of the tractor would be supported by the plow, and the driving wheels would lose their grip. On the other hand, still supposing that the plow were rigid with the tractor, and the front wheels of the tractor dropped into a hollow, that would have the effect of making the ploughing too shallow, or, if the hollow were deep enough, pitching the implement right out of the ground. Full provision has been made to get over these difficulties, as reference to the drawings will show.

When the implement is in operation in the ground, the crank webs $b^{51}$ are locked solid with the tractor through the medium of the control lever $b^{74}$ and its quadrant, and the plow runs on the sole plate or skid $a^{32}$.

Should the front wheels of the tractor drop into a hollow the crank pin $b^{52}$, being free to rotate in the end of the crank webs $b^{51}$, allows the plow to remain at a regular depth of cut, because the front of the tractor can go down without pitching the plow upwards, due to the fact that the crank webs $b^{51}$ rotate around the crank pin $b^{52}$. This provides for downward movement of the plow relative to the tractor. When this movement takes place the springs $b^{57}$ collapse slightly.

Should the front wheels of the tractor run up on a height and tend to push the plow into the ground, or to make the plow support the weight of the tractor, the crank pin $b^{52}$, being free to rotate in the end of the crank webs $b^{51}$ allows the plow to remain at a regular depth of cut, because the front of the tractor can go up without pitching the plow downwards, due to the fact that the crank webs $b^{51}$ rotate around the crank pin $b^{52}$. This provides for upward movement of the plow relative to the tractor. When this movement takes place the springs $b^{57}$ stretch slightly.

It will be understood that there may be under certain circumstances a certain amount of upward and downward pitching of the plow, as the tractor would follow the contour of the land, but my flexible method of connection makes this movement quite immaterial for all practical purposes.

My construction prevents the usual "winging of the plow."

It will be understood that where, in the specification and claims I have referred to the tractor drawn implement as a plow I wish it to be understood that by the term "plow" I desire to include any implement drawn by the tractor and with which the tractor cooperates in the manner herein set forth.

When reversing, the rounded end of the skid $a^{32}$ keeps the plow from penetrating into the ground, so that the tractor can readily move backwards.

Having now fully described my invention what I claim and desire to secure by Letters Patent is:—

1. In combination, a tractor, a plow, a coupling between the tractor and plow said coupling permitting the plow freedom of up and down and lateral movement relatively to the tractor and means co-acting with the plow and tractor to hold the plow in the ground while being drawn by the tractor.

2. In combination, a tractor, a plow, a coupling between the tractor and plow said coupling permitting the plow freedom of up and down and lateral movement relatively to the tractor and spring means co-acting with the plow and tractor to hold the plow in the ground while being drawn by the tractor.

3. In combination, a tractor, a plow, a coupling between the tractor and plow said coupling permitting the plow a free swivel movement relatively to the tractor about a longitudinal axis and means co-acting with the plow and tractor to hold the plow in the ground while being drawn by the tractor.

4. In combination, a tractor, a plow, a coupling between the tractor and plow said coupling permitting the plow freedom of up and down and lateral movement relatively to the tractor and means co-acting with the plow and tractor automatically to hold the plow in the ground while being drawn by the tractor.

5. In combination, a tractor, a plow, a coupling between the tractor and plow said coupling permitting the plow freedom of up and down, lateral, and swivelling movement relatively to the tractor and means co-acting with the plow and tractor to hold the plow in the ground while being drawn by the tractor.

6. In combination, a tractor, a plow, a coupling between the tractor and the plow, said coupling permitting the plow freedom of up and down and lateral movement relatively to the tractor, a head on the plow, an abutment on the tractor, and means co-acting with said head and said abutment to hold the plow in the ground while being drawn by the tractor.

7. In combination, a tractor, a plow, a coupling between the tractor and plow said coupling permitting the plow freedom of up and down and lateral movement relatively to the tractor and means co-acting with the plow and tractor whereby the tractor is caused to function automatically as a means to hold the plow in the ground while being drawn by the tractor.

8. In combination, a tractor, a plow, a coupling between the tractor and plow, said coupling permitting the plow freedom of up and down, lateral, and swivelling movement relatively to the tractor, means to lock the plow in any position to which it has been swivelled, and spring means co-acting with the plow and tractor to hold the plow in the ground while being drawn by the tractor.

9. In combination, a tractor, a plow, a coupling between the tractor and plow, said coupling comprising a fork connected to the tractor and pivoted to the plow on a horizontal longitudinal pivot to permit the plow to swivel freely relatively to the tractor, and means co-acting with the plow and tractor to hold the plow in the ground while being drawn by the tractor.

10. In combination, a tractor, a plow, a coupling between the tractor and plow, said coupling comprising a fork connected to the tractor and pivoted to the plow on a horizontal longitudinal pivot to permit the plow to swivel, a crank-pin carrier pivoted to said fork by a vertical pin to permit the plow to swing laterally, transverse horizontal crank-pins on the carrier mounted in crank webs to permit the plow to rise and fall about said crank-pins, and means co-acting with the plow and tractor to hold the plow in the ground while being drawn by the tractor.

11. In combination, a tractor, a plow, a coupling between the tractor and plow, said coupling comprising a fork pivoted to the plow on a horizontal longitudinal pivot, a crank-pin carrier pivoted to said fork by a vertical pin, crank-webs pivoted on the tractor, transverse horizontal crank-pins on the carrier mounted in said crank-webs, an abutment on the tractor, a spring element on the fork and co-acting with the abutment to hold the plow in the ground while being drawn by the tractor.

12. In combination, a tractor, a plow, a coupling between the tractor and plow, said coupling comprising a fork connected to the tractor and pivoted to the plough on a horizontal longitudinal pivot, a crank-pin carrier pivoted to said fork by a vertical pin, crank-webs pivoted on the tractor, transverse horizontal crank-pins on the carrier mounted in said crank-webs, a crank shaft carried by the tractor on which said webs are mounted, manually operable means for raising and lowering said crank-pins, an abutment on the tractor, and a spring element co-acting therewith to hold the plow in the ground while being drawn by the tractor.

13. In combination, a tractor, a plow, a coupling between the tractor and plow, said coupling comprising a fork connected to the tractor and pivoted to the plow on a horizontal longitudinal pivot, a crank-pin carrier pivoted to said fork by a vertical pin, a crank shaft carried by the tractor, crank-webs pivoted on said crank shaft, transverse horizontal crank-pins on the carrier mounted in said crank-webs, manually operable means for oscillating said webs about said crank shaft, a spring tooth and quadrant to lock the plow in any position to which it has been swivelled, means to limit the rise and fall of the plow about the crank-pins, an abutment on the tractor, and a leaf spring carried by the fork and co-acting with the abutment to hold the plow in the ground while being drawn by the tractor.

14. In combination, a tractor, a plow, a shaft on the tractor, crank-webs on the shaft, a head on the plow, a coupling carried by the said webs and connected to the said head and permitting the plow up and down, lateral, and swivelling movement relatively to said tractor, a spring carried by the coupling, and an abutment on the tractor coacting with the spring to hold the plow in the ground while being drawn by the tractor.

15. In combination, a tractor, a plow, a shaft on the tractor, crank-webs on the shaft, a head on the plow, a coupling carried by the said webs and connected to the said head and permitting the plow up and down, lateral, and swivelling movement relatively to said tractor, a spring carried by the coupling, an abutment on the tractor co-acting with the spring to hold the plow in the ground while being drawn by the tractor, means on the plow and co-acting with the coupling to hold the plow in any position to which it has been swivelled, and means on the tractor to limit the vertical movement of the plow relatively to the tractor.

16. In combination, a tractor, a plow, a shaft on the tractor, crank-webs on the shaft, a head on the plow, a coupling carried by the said webs and connected to the said head and permitting the plow up and down and lateral movement relatively to said tractor, a spring carried by the coupling, and an abutment on the tractor co-acting with the spring to hold the plow in the ground while being drawn by the tractor.

17. In combination, a tractor, a plow, a coupling between the tractor and plow said coupling permitting the plow freedom of up and down movement relatively to the tractor, an abutment on the tractor and means intermediate the abutment and plow to hold the plow at a uniform depth due to the resistance offered by the tractor.

18. In combination, a tractor, a plow, a coupling between the tractor and plow said coupling permitting the plow freedom of up and down movement relatively to the tractor, an abutment on the tractor and resilient means intermediate the abutment and plow to hold the plow at a uniform depth due to the resistance offered by the tractor.

19. In combination, a tractor, a plow, a coupling between the tractor and plow said coupling permitting the plow freedom of up and down movement relatively to the tractor, an abutment on the tractor and means intermediate the abutment and plow to hold the plow at a uniform depth due to the resistance offered by the tractor, said means being in slidable engagement with the abutment and capable of movement thereagainst.

In testimony whereof I affix my signature in presence of two witnesses.

HARRY FERGUSON.

Witnesses:
ANDREW HAMILTON,
JOHN KNOX.